United States Patent [19]

Barley et al.

[11] Patent Number: 5,611,596
[45] Date of Patent: Mar. 18, 1997

[54] CHILD SAFETY SEAT

[75] Inventors: Geoffrey W. Barley, Salisbury; David W. Burleigh, Bognor Regis; Shaun Carine, Andover; Andrew P. Beaumont, Basingstoke, all of England; Hermann Wetter, Ulm, Germany

[73] Assignee: Britax-Excelsior Limited, Hampshire, England

[21] Appl. No.: 605,271

[22] Filed: Feb. 6, 1996

[30] Foreign Application Priority Data

Feb. 18, 1995 [GB] United Kingdom ................... 9503222

[51] Int. Cl.⁶ ................................ A47C 1/08; A47D 1/10
[52] U.S. Cl. .................... 297/256.13; 397/354.12; 397/354.13; 397/363; 397/364; 397/368; 397/369
[58] Field of Search ........................ 297/256.13, 354.12, 297/354.13, 363, 364, 368, 369

[56] References Cited

U.S. PATENT DOCUMENTS

| | | | |
|---|---|---|---|
| 4,762,364 | 8/1988 | Young | 297/256.13 X |
| 4,826,246 | 5/1989 | Meeker | 297/256.13 X |
| 4,913,490 | 4/1990 | Takahashi et al. | 297/256.13 |

FOREIGN PATENT DOCUMENTS

| | | |
|---|---|---|
| 4240450 | 3/1994 | Germany . |
| 4405147 | 8/1995 | Germany . |

Primary Examiner—Peter M. Cuomo
Assistant Examiner—Rodney B. White
Attorney, Agent, or Firm—Davis and Bujold

[57] ABSTRACT

A child safety seat for use in a vehicle comprises a seat body having a seat portion and a backrest portion. Guides on the seat body define a strap path for a strap of an adult seat belt which secures the seat body to a vehicle seat. A strap deflecting lever is movable between a first position clear of said strap path and a second position in which the strap is deflected and thus tightened.

29 Claims, 16 Drawing Sheets

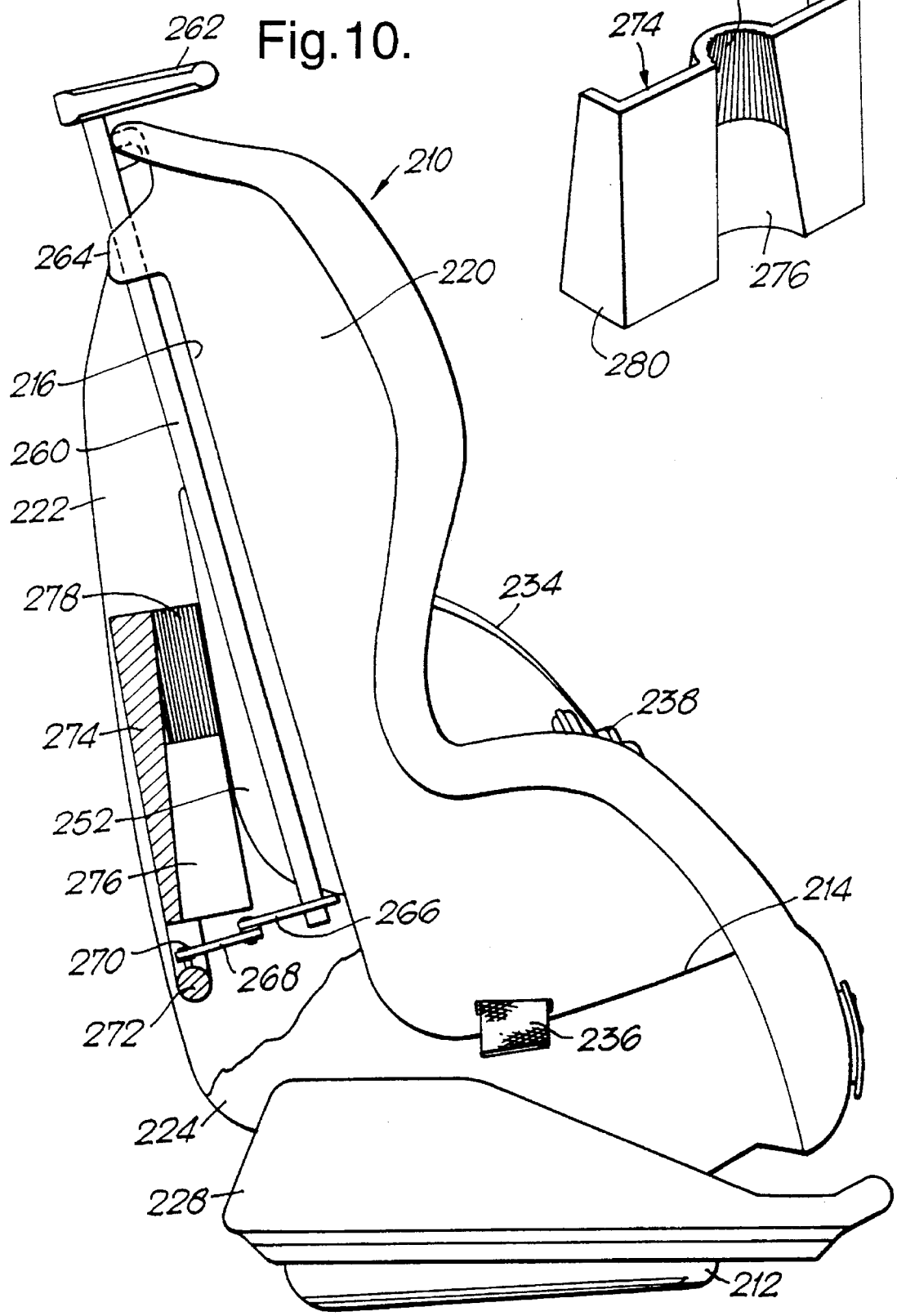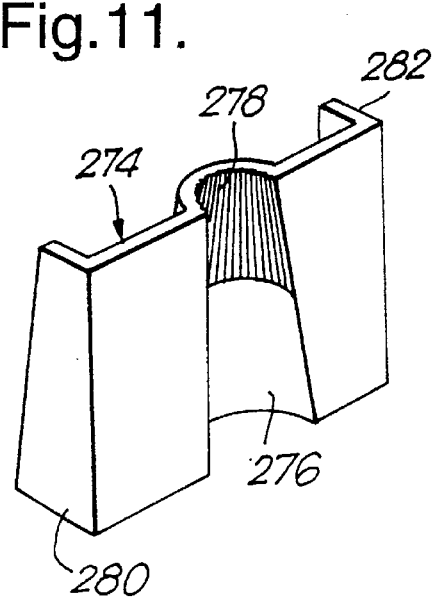

CHILD SAFETY SEAT

FIELD

This invention relates to a child safety seat for use in a vehicle of the type comprising a seat body having a seat portion and a backrest portion, a child restraint for an occupant of the seat secured to the seat, and guide means on the seat defining a strap path for a strap of an adult seat belt to secure the seat to a vehicle seat.

The disadvantage of this arrangement is that, even if the adult belt is pulled very tight during installation, the resilience of both the vehicle seat and the adult belt will permit undesirable movement of the child seat relative to the vehicle in the event of sudden deceleration, for example during an accident.

RELATED ART

U.S. Pat. No. 4,913,490 discloses a child safety seat of this type in which the guide means includes two pivotally mounted levers which can be moved away from the normal positions which they occupy when the child seat is secured in the vehicle but which relies on a vehicle seat belt retractor to tighten the vehicle seat belt after the levers have been secured in said normal positions.

SUMMARY OF THE INVENTION

According to the invention, a child safety seat of the type described above has strap deflecting means mounted on the seat for movement between a first position clear of said strap path and a second position in which a strap following said strap path is deflected therefrom, thereby to tighten such strap.

Preferably, the seat is provided with blocking means arranged to obstruct passage along said strap path of objects of larger cross-section than said strap when the strap deflecting means is in its second position.

BRIEF DESCRIPTION OF THE DRAWINGS

FIG. 10 is a partially broken away side view of the seat shown in FIG. 9;

FIG. 11 is a perspective view of a component of the child safety seat shown in FIGS. 9 and 10;

DETAILED DESCRIPTION OF THE PREFERRED EMBODIMENT

Figure 1:
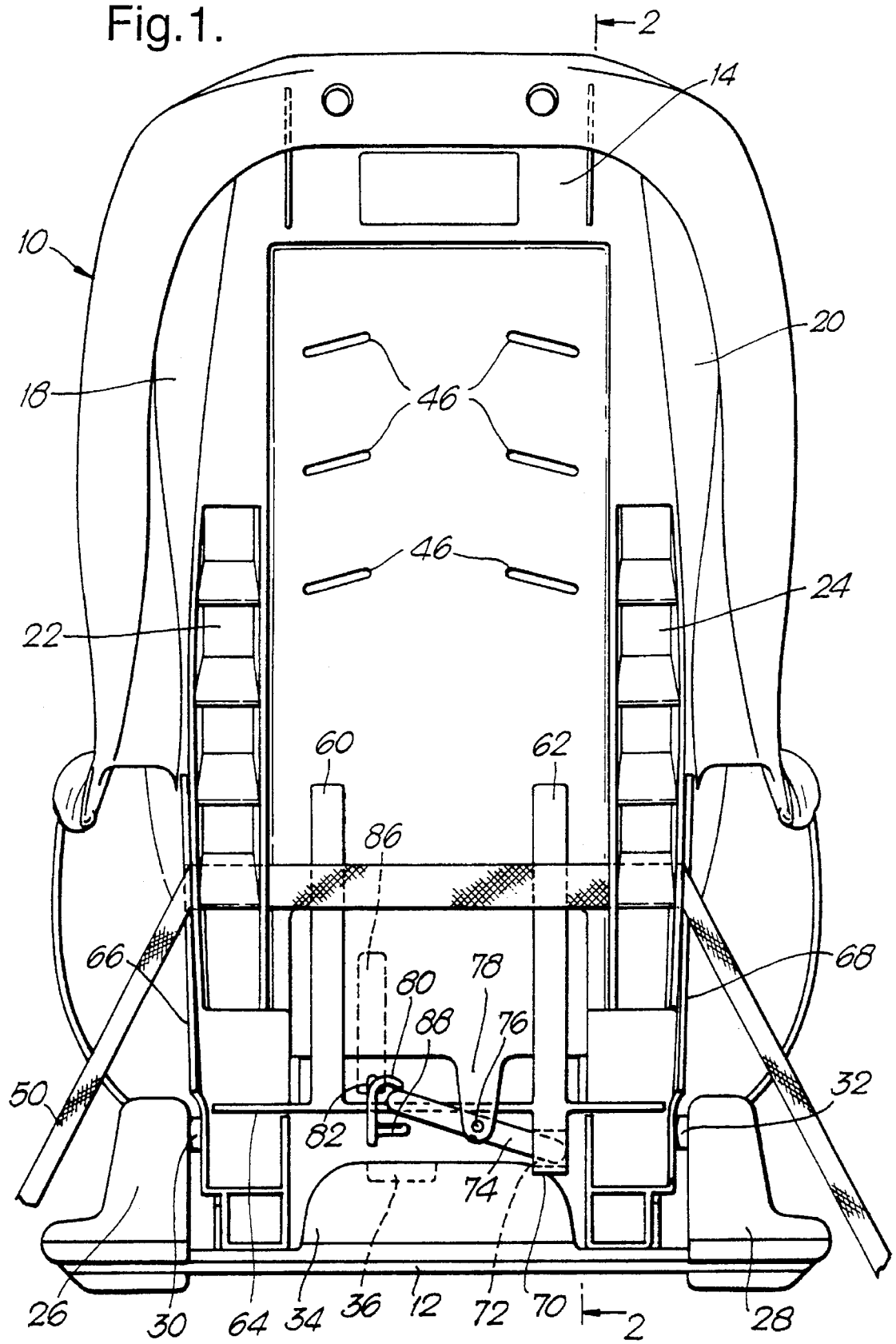
FIG. 1 is a rear elevation of a child safety seat in accordance with a first embodiment of the invention, with the strap deflecting means in the first position.
Figure 2:
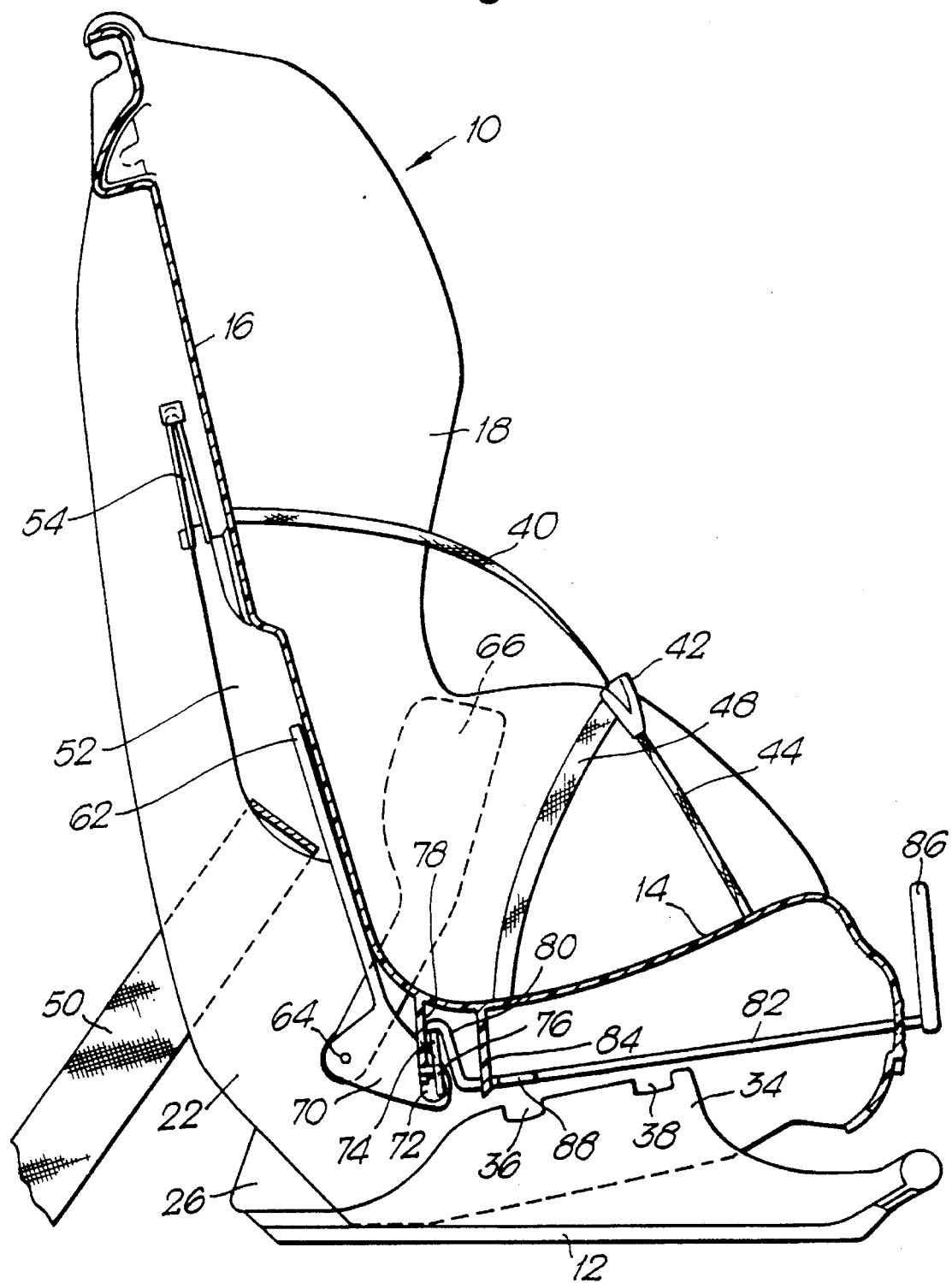
FIG. 2 is a longitudinal cross-sectional taken on the line 2—2 in FIG. 1.

Referring to FIGS. 1 and 2, a child safety seat comprises a shell 10 and a base 12. The shell 10 is formed as a one-piece plastics moulding and has a seat portion 14, a backrest portion 16 and side walls 18 and 20. Respective reinforcing beams 22 and 24 project downwardly and rearwardly from the junction between each side wall 18, 20 and the seat and backrest portions 14 and 16.

The base 12 has a pair of upstanding walls 26 and 28, spaced apart by a greater distance than the beams 22 and 24 of the shell 10 and carrying a pair of mutually aligned stub axles 30 and 32 which are journaled in holes in the beams 22 and 24 so as to pivotally connect the shell 10 to the base 12. A central projection 34 on the base 12 has front and rear notches 36 and 38 in its upper surface, forming alternative detent recesses whereby the shell 10 may be secured either in an upright position (as illustrated), or in a reclined position, as will be described hereinafter.

The shell 10 is fitted with a conventional harness for a child occupant, consisting of a pair of shoulder straps 40 connected by a buckle 42 to a crotch strap 44. The backrest portion 16 has three sets of slots 46 to provide alternative positions for attaching the shoulder straps 40. The harness may also include a pair of lap straps 48.

In use, the base 12 is positioned on a vehicle seat and secured in place by an adult lap belt 50 which projects through openings 52 in each of the beams 22 and 24. Each of the openings 52 has an upper extension 54, one of which is used to receive an adult shoulder belt when the child seat is installed on a vehicle seat equipped with a three-point adult seat belt.

In accordance with the invention, a pair of belt deflection levers 60 and 62 which are formed integrally with a horizontal shaft 64, the ends of which project through the beams 22 and 24 and have respective shutters 66 and 68 secured thereon. The lever 62 has a forwardly and downwardly projecting extension 70 containing a transverse opening 72 which receives one end of a coupling lever 74. The coupling lever 74, is pivotally mounted at its centre on a pin 76 which projects forwardly from a web 78 extending between the beams 22 and 24. The other end of the coupling lever 74 is engaged by a crank 80 on the rear end of a longitudinally extending shaft 82 which is journaled in holes in a second web 84 (parallel to the web 78) and the front edge of the seat shell 10, and has a handle 86 on its front end.

Figure 3:
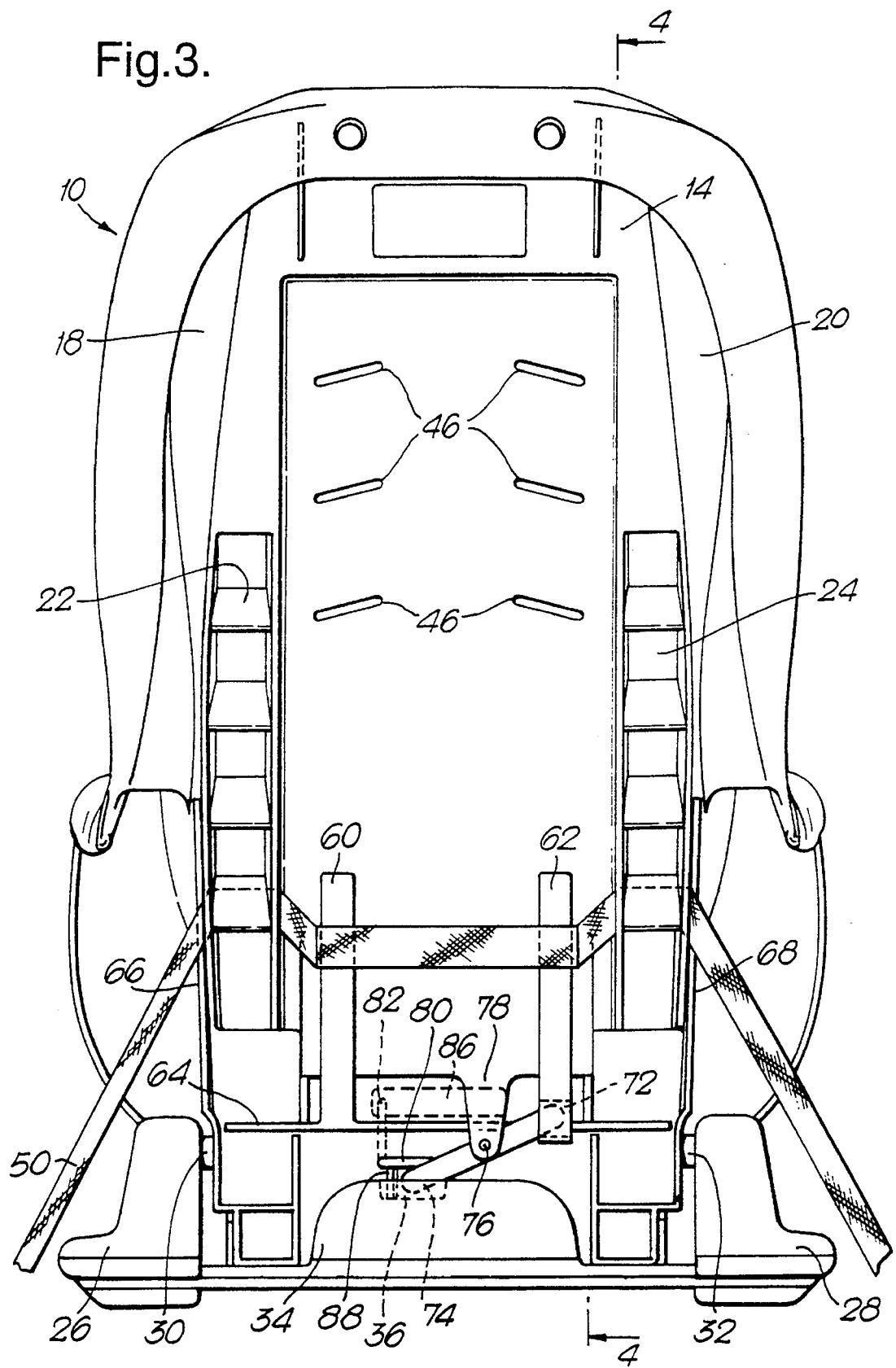
FIG. 3 is a rear elevation of the seat shown in FIGS. 1 and 2, with the strap deflecting means in the second position.
Figure 4:
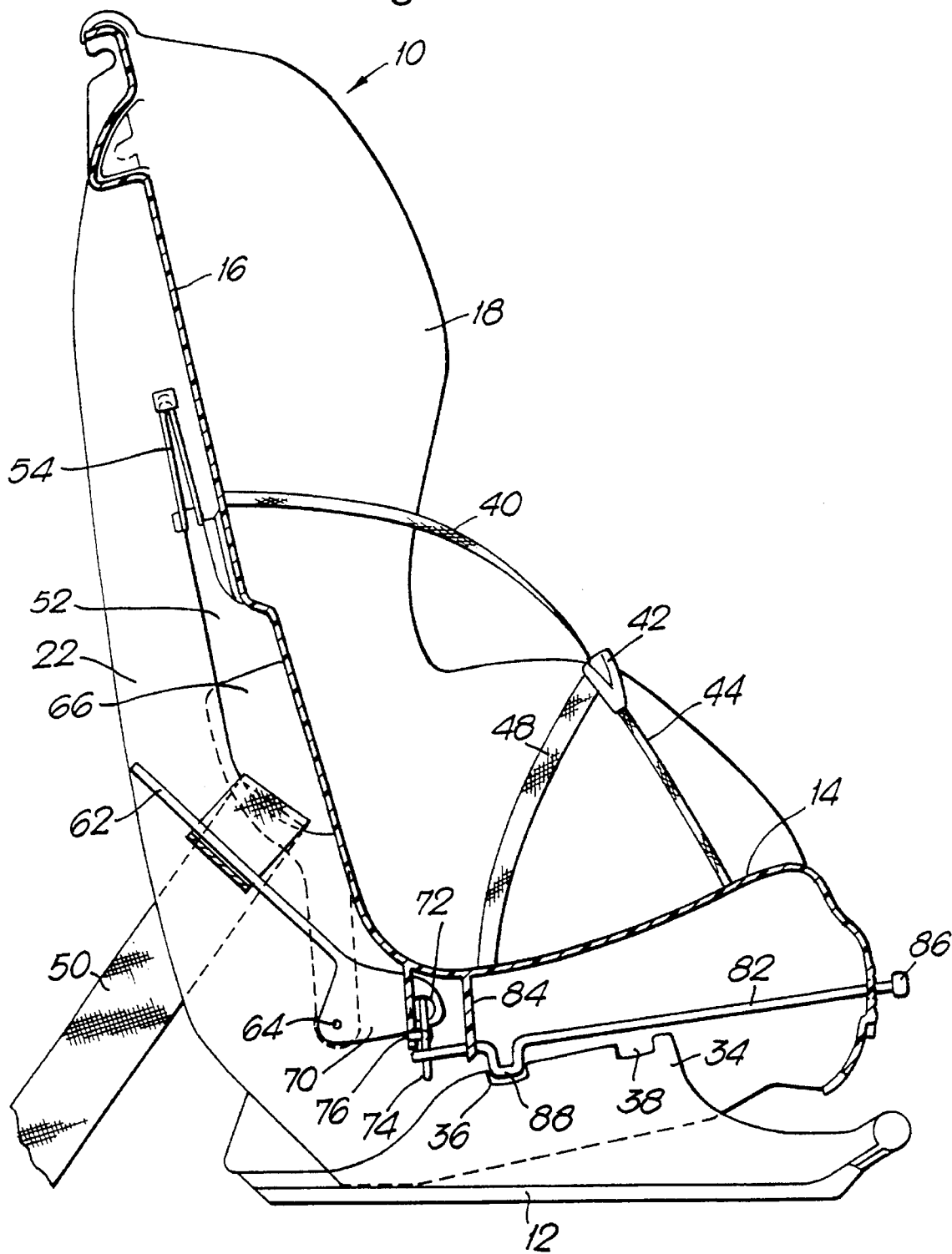
FIG. 4 is a longitudinal cross-sectional taken on the line 4—4 in FIG. 3.

When the lap belt 50 has been secured, as shown in FIGS. 1 and 2, the handle 86 is turned through 90° to the position shown in FIGS. 3 and 4. The crank 80 pivots the coupling lever 74 counterclockwise (as viewed in FIGS. 1 and 3) to a horizontal position, thereby pivoting the deflection levers 60 and 62 rearwardly of the rear edges of the openings 52 in the beams 22 and 24. This tightens the adult belt 50 by causing it to follow a longer path between the two openings 52.

At the same time, an offset portion 88 of the longitudinally extending shaft 82 (located in front of the web 84) moves into engagement with the rear notch 36 in the central projection 34 on the base 12 to secure the shell 10 in its upright position relative to the base 12. Alternatively, if the shell 10 is in its reclined position when the coupling lever 74 is turned counterclockwise, the offset portion 88 of the longitudinally extending shaft 82 engages with the front notch 38.

When the deflection levers 60 and 62 are in their rearward position, as illustrated in FIGS. 3 and 4, the shutters 66 and 68 cover the lower parts of the openings 52 in the beams 22 and 24. Consequently, if the lever 86 is pivoted to its horizontal position (as shown in FIGS. 3 and 4) before the adult lap belt 50 has been inserted through the openings 52, subsequent insertion is obstructed. This minimises possible maloperation due to insertion of the adult belt in front of the deflection levers 60 and 62.

Figure 5:
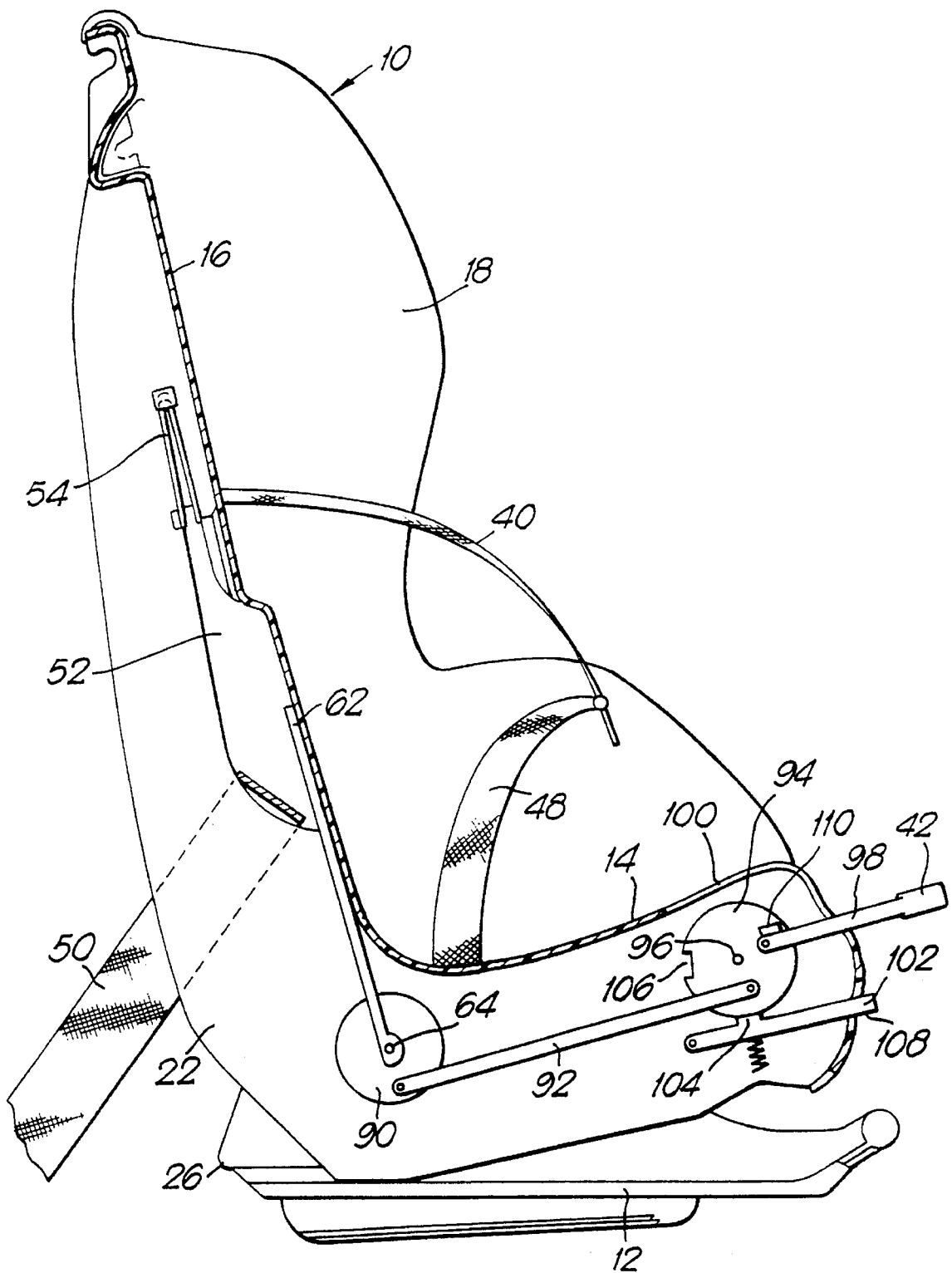
FIG. 5 is a cross-sectional view, similar to FIG. 2, of a second embodiment of the invention.
Figure 6:
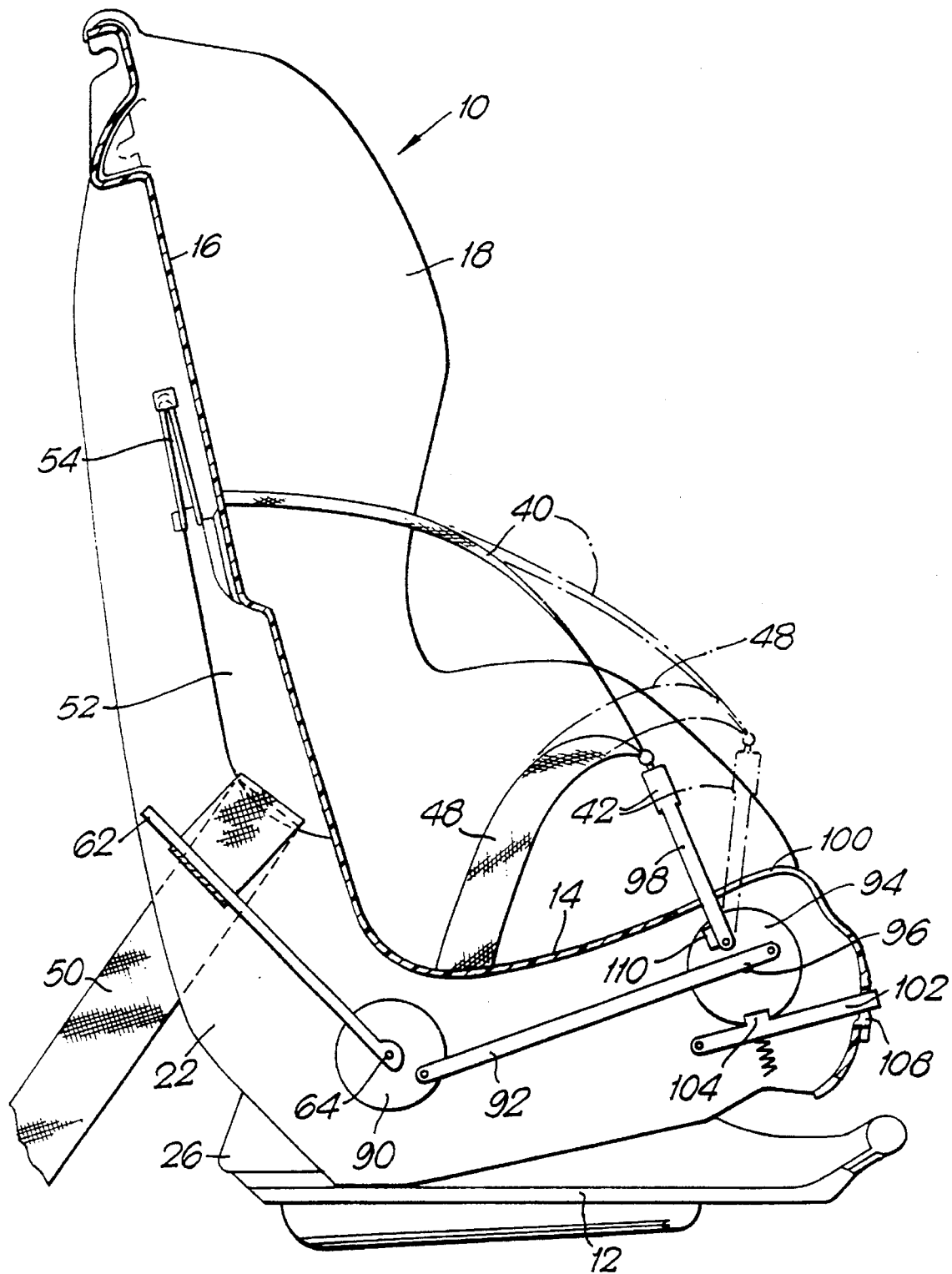
FIG. 6 is a is a cross-sectional view, similar to FIG. 4 of the embodiment shown in FIG. 5.

FIGS. 5 and 6 show a modified child safety seat, having a shell 10, a base 12, and deflection levers 60 and 62 which are formed integrally with a horizontal shaft 64. Many of the other components are the same as the corresponding components of the seat shown in FIGS. 1 to 4 and are denoted by the same reference numerals. However, in place of the longitudinal shaft 82 and coupling lever 74, the horizontal shaft 64 carries a disk 90 which is coupled by an eccentric link 92 to a similar disk 94 which is journaled on an axle 96 under the front part of the seat portion 14. The disk 94 carries a stalk 98 which projects through a slot 100 in the seat portion 14 and has the buckle 42 on its radially outer end.

Angular movement of the stalk 98 from the position shown in FIG. 5 to the position shown in FIG. 6, brings the buckle 42 into a position in which it can engage with the shoulder and lap straps 40 and 48 of the harness. A latch lever 102 is resiliently biased upwardly so that a detent 104 thereon engages in a notch 106 in the disk 94 to hold the deflection levers 60 and 62 in the position shown in FIG. 6. The front end of the latch lever 102 projects through an opening 108 in the front edge of the seat portion 14 to enable the detent 104 to be disengaged manually.

The stalk may be connected rigidly to the disk 94 but the buckle 42 then requires extensive padding to avoid injuring a child occupant of the seat during an accident. It is preferable for the stalk 98 to be pivotally mounted on the disk 94 with rearward angular movement limited by a stop 110. In the event of an accident, the stalk 94 can pivot forwardly to the position shown in chain-dotted lines in FIG. 6.

Figure 7:
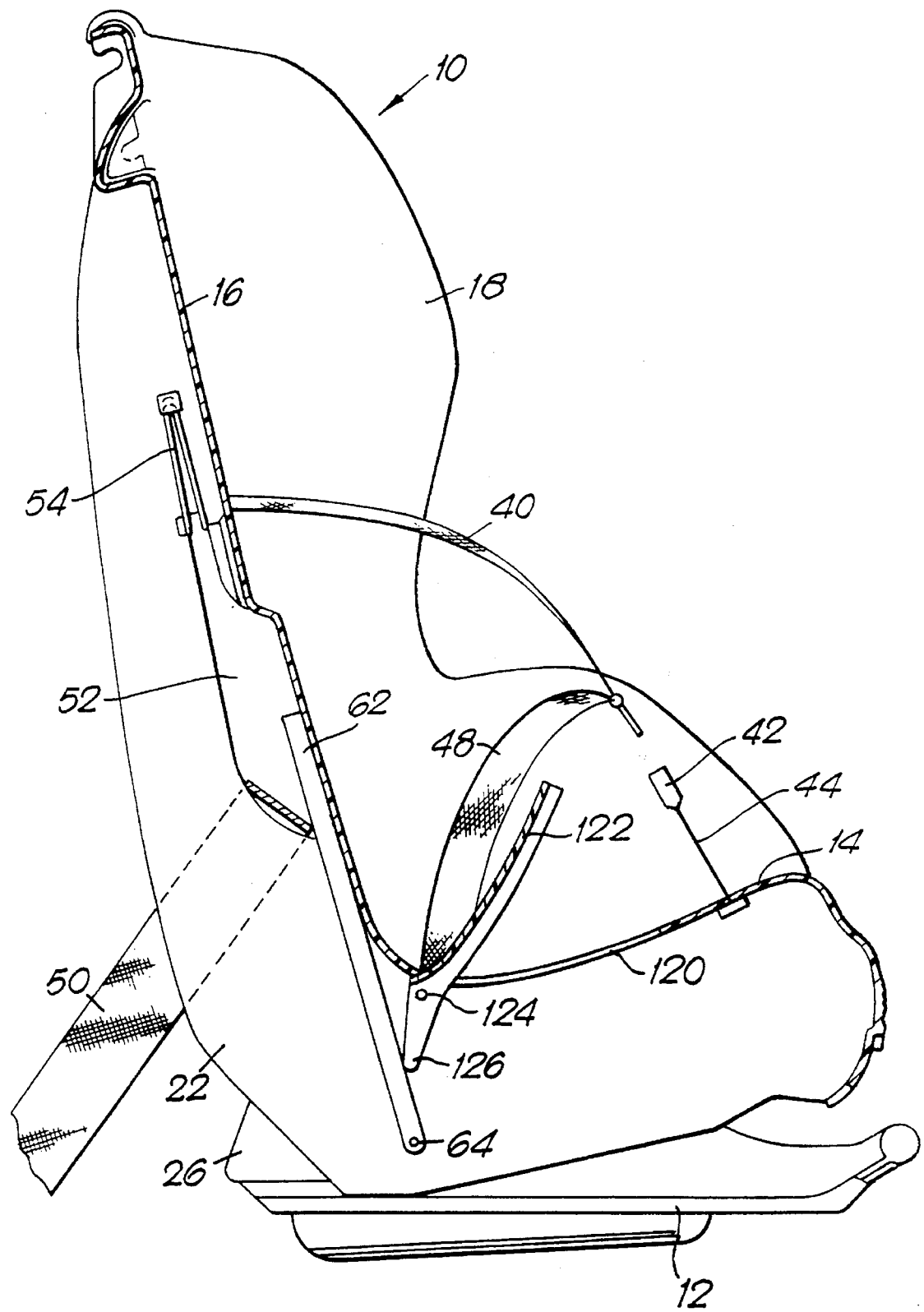
FIG. 7 is a cross-sectional view, similar to FIG. 2, of a third embodiment of the invention.
Figure 8:
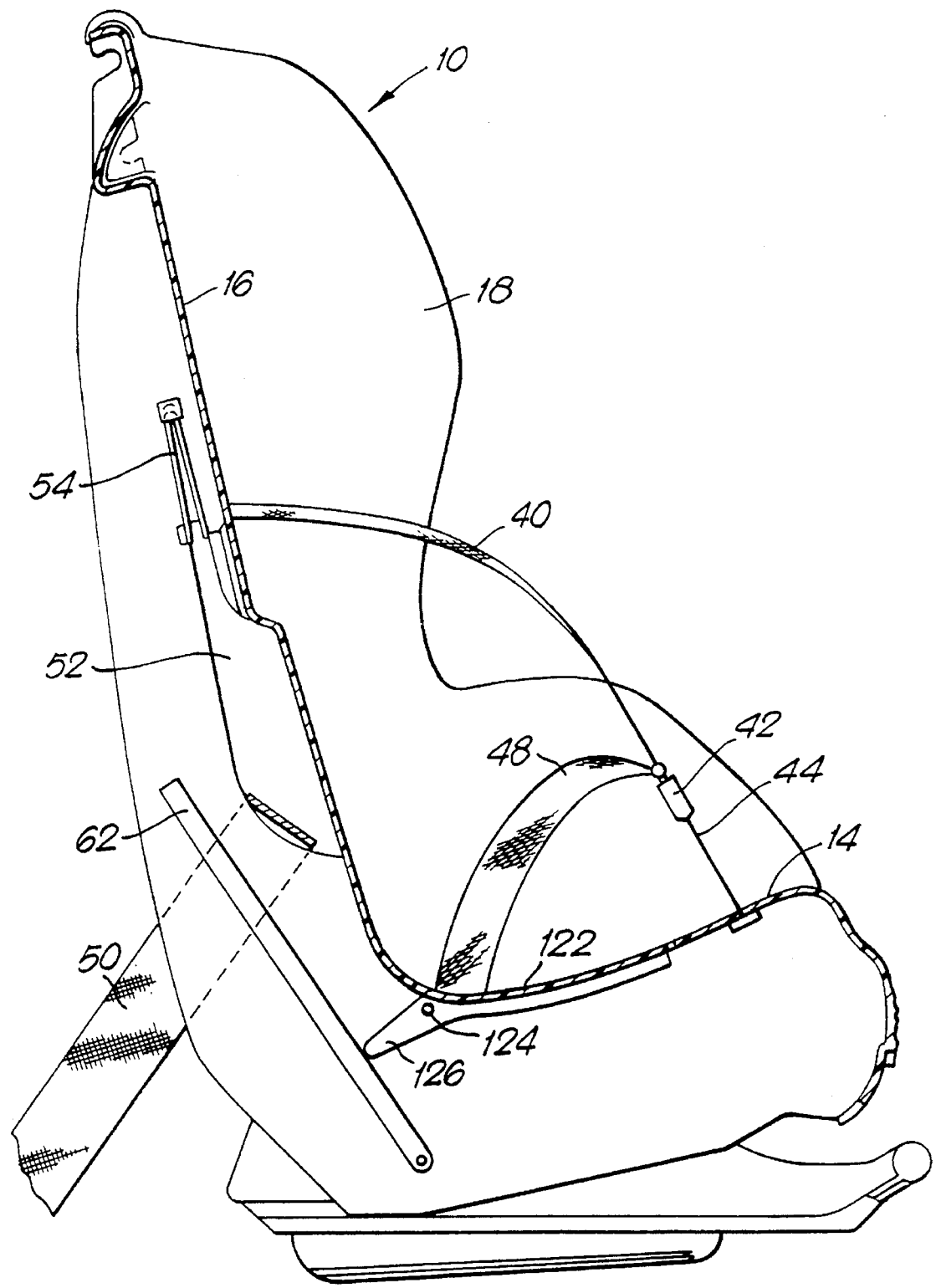
FIG. 8 is a is a cross-sectional view, similar to FIG. 4, of the embodiment shown in FIG. 7.
Figure 9:
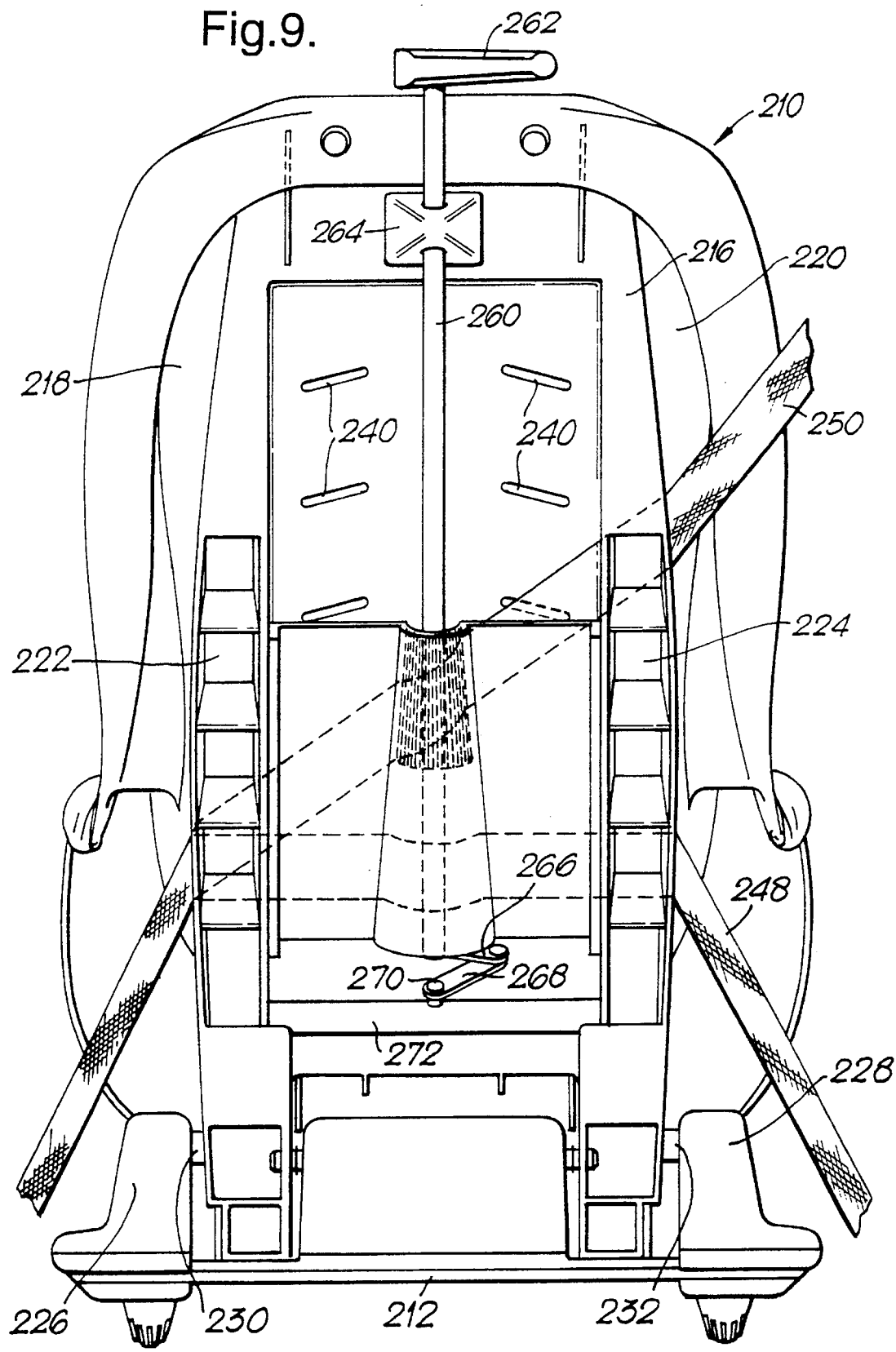
FIG. 9 is a rear elevation of a child safety seat in accordance with a fourth embodiment of the invention, with the strap deflecting means in the first position.
Figure 12:
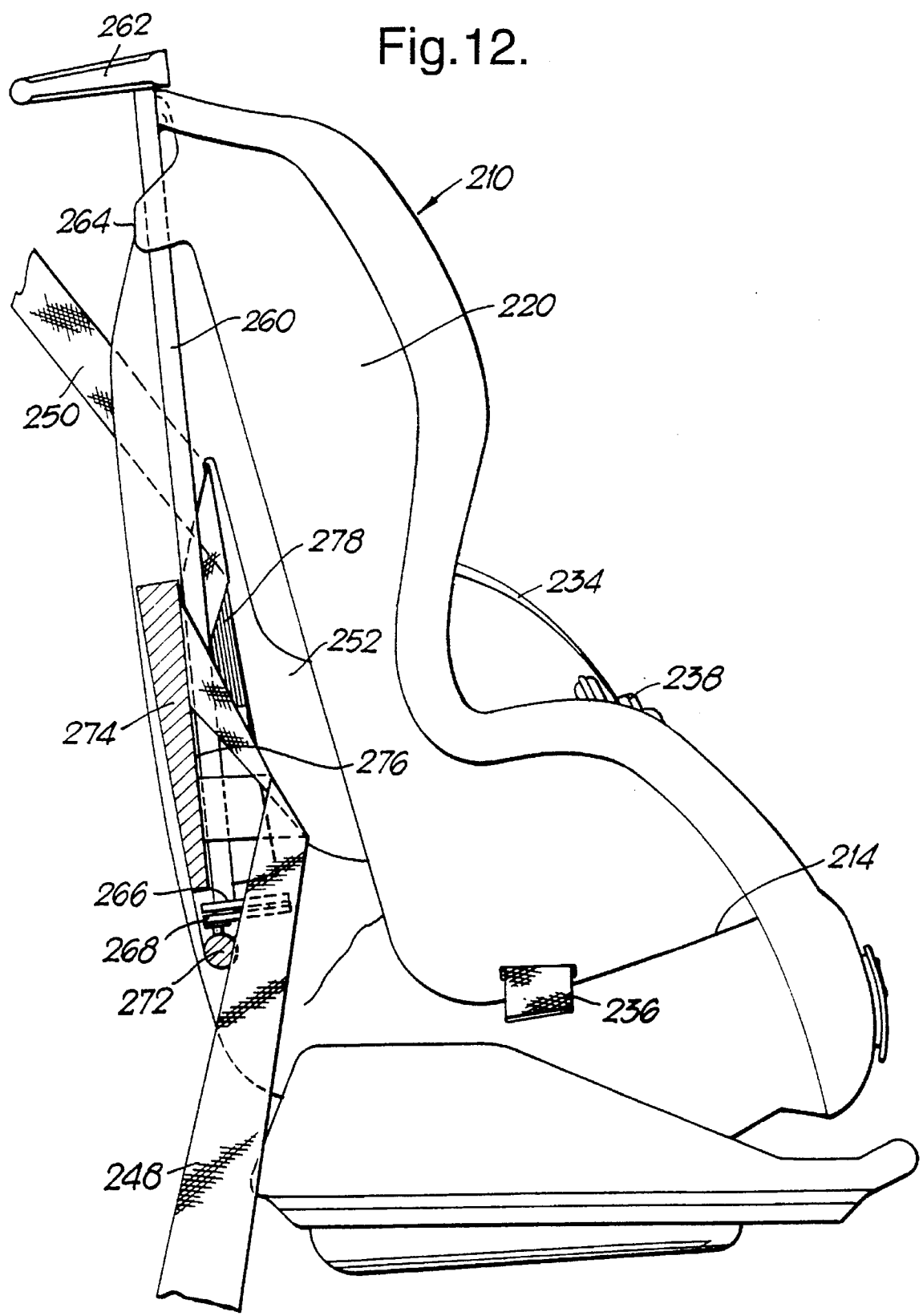
FIG. 12 is a side view, similar to FIG. 10 but with the strap deflecting means in the second position.

FIGS. 7 and 8 show another modified child safety seat, having a shell 10, a base 12, and deflection levers 60 and 62 which are formed integrally with a horizontal shaft 64. Many of the other components are the same as the corresponding components of the seat shown in FIGS. 1 to 4 and are denoted by the same reference numerals. In this seat, in place of the longitudinal shaft 82 and coupling lever 74, an opening 120 is formed towards the rear of the seat portion 14. A flap 122, having an upper surface dimensioned to fit the opening 120, is pivotally mounted on an axle 124 below the rear edge of the opening. The flap 122 also has a heel 126 projecting rearwardly below the seat portion 14 into camming engagement with the deflection levers 60 and 62. When the deflection levers 60 and 62 are in their forward position, allowing the adult lap belt to be threaded through the openings 52, the flap 122 projects upwardly as shown in FIG. 7, preventing occupation of the seat shell 10 by a child. When the flap 122 is pressed down level with the seat portion 14, the deflection levers 60 and 62 are moved to the position shown in FIG. 8, tensioning the adult lap belt 50.

The seats shown in FIGS. 5 to 8 may be provided with shutters similar to the shutters 66 and 68 of FIGS. 1 to 4 to minimise possible maloperation due to insertion of the adult belt in front of the deflection levers 60 and 62. The shells 10 of both such seats are tiltable relative to their respective bases 12 and have means (not shown) for securing them in alternative upright and reclined positions.

Referring to FIGS. 9 to 12, another child safety seat comprises a shell 210 and a base 212. The shell 210 is formed as a one-piece plastics moulding and has a seat portion 214, a backrest portion 216 and side walls 218 and 220. Respective reinforcing beams 222 and 224 project downwardly and rearwardly from the junction between each side wall 218, 220 and the seat and backrest portions 214 and 216.

The base 212 has a pair of upstanding walls 226 and 228, spaced apart by a greater distance than the beams 222 and 224 of the shell 210 and carrying a pair of mutually aligned stub axles 230 and 232 which are journaled in holes in the beams 222 and 224 so as to pivotally connect the shell 210 to the base 212. Latch means (not shown) secure the shell 210 either in an upright position (as illustrated), or in a reclined position.

The shell 210 is fitted with a conventional harness for a child occupant, consisting of a pair of shoulder straps 234 and a pair of lap straps 236 connected by a buckle 238 to a crotch strap (not shown). The backrest portion 216 has two sets of slots 240 to provide alternative positions for attaching the shoulder straps 234.

In use, the base 212 is positioned on a vehicle seat and secured in place by an adult three-point belt, the lap strap 248 and shoulder strap 250 of which project through openings 252 in each of the beams 222 and 224.

In accordance with the invention, a clamping rod 260, having an operating handle 262 on its upper end, is journaled in a bearing 264 which is secured to the shell 210 near the top of the seat back and which allows a limited range of angular movement of the clamping rod 260 about orthogonal horizontal axes. The bottom of the clamping rod 260 is rigidly attached to a laterally projecting lever 266 which is pivotally connected to one end of a link 268, the other end of which is connected by a pivot pin 270 to a strut 272 extending between the beams 222 and 224.

A clamp plate 274 extends between the beams 222 and 224 above the strut 272. As can best be seen from FIG. 11, the clamp plate 274 has a recess 276 having a frusto-conical surface, the upper part 278 of which is knurled. The clamp plate 274 also has side flanges 280 and 282 which abut against the beams 222 and 224.

When the lever 266 is in end-to-end alignment with the link 268, as shown in FIG. 10, the clamping rod 260 is in close proximity to the backrest portion 216 and the adult belt 248, 250 can readily pass through the openings 252 in the beams 222 and 224 and between the clamping rod 260 and the clamp plate 274. If the handle is then turned through 180° to the position shown in FIG. 12, the lap strap 248 is tensioned by being deflected rearwardly into the bottom part of the recess 276. At the same time, the shoulder strap 250 is clamped between the clamping rod 260 and the knurled upper part 278 of the recess 276. If, as is usual the lap strap 248 and the shoulder strap 250 of the adult belt are formed from a continuous length of webbing which runs trough a loop on a buckle tongue, this prevents webbing from the shoulder strap 250 feeding through such loop so as to lengthen the lap strap.

FIGS. 13 to 17 show yet another child safety seat comprising a shell 310 and a base 312. The shell 310 is formed as a one-piece plastics moulding and has a seat portion 314, a backrest portion 316 and side walls 318 and 320. Respective reinforcing beams 322 and 324 project downwardly and rearwardly from the junction between each side wall 318, 320 and the seat and backrest portions 314 and 316.

The base 312 has a pair of upstanding walls 326 and 328, spaced apart by a greater distance than the beams 322 and 324 of the shell 310 and carrying a pair of mutually aligned stub axles 330 and 332 which are journaled in holes in the beams 322 and 324 so as to pivotally connect the shell 310 to the base 312 so that the shell is movable between an upright position (as illustrated), or a reclined position. The base 312 has a handle 334 extending along its front edge.

The shell 310 is fitted with a conventional harness (not shown) for a child occupant, similar to the harness of FIGS. 9 to 12. The side wall 318 has a slot 336 for one of the lap straps of such a harness and the other side wall 316 has a corresponding slot (not shown). The backrest portion 316 has two sets of slots 340 to provide alternative positions for attaching the shoulder straps.

The base 312 can be positioned on a vehicle seat and the child seat secured in place by an adult three-point belt, the lap strap 348 and shoulder strap 350 of which project through openings 352 in each of the beams 322 and 324.

Figure 13:
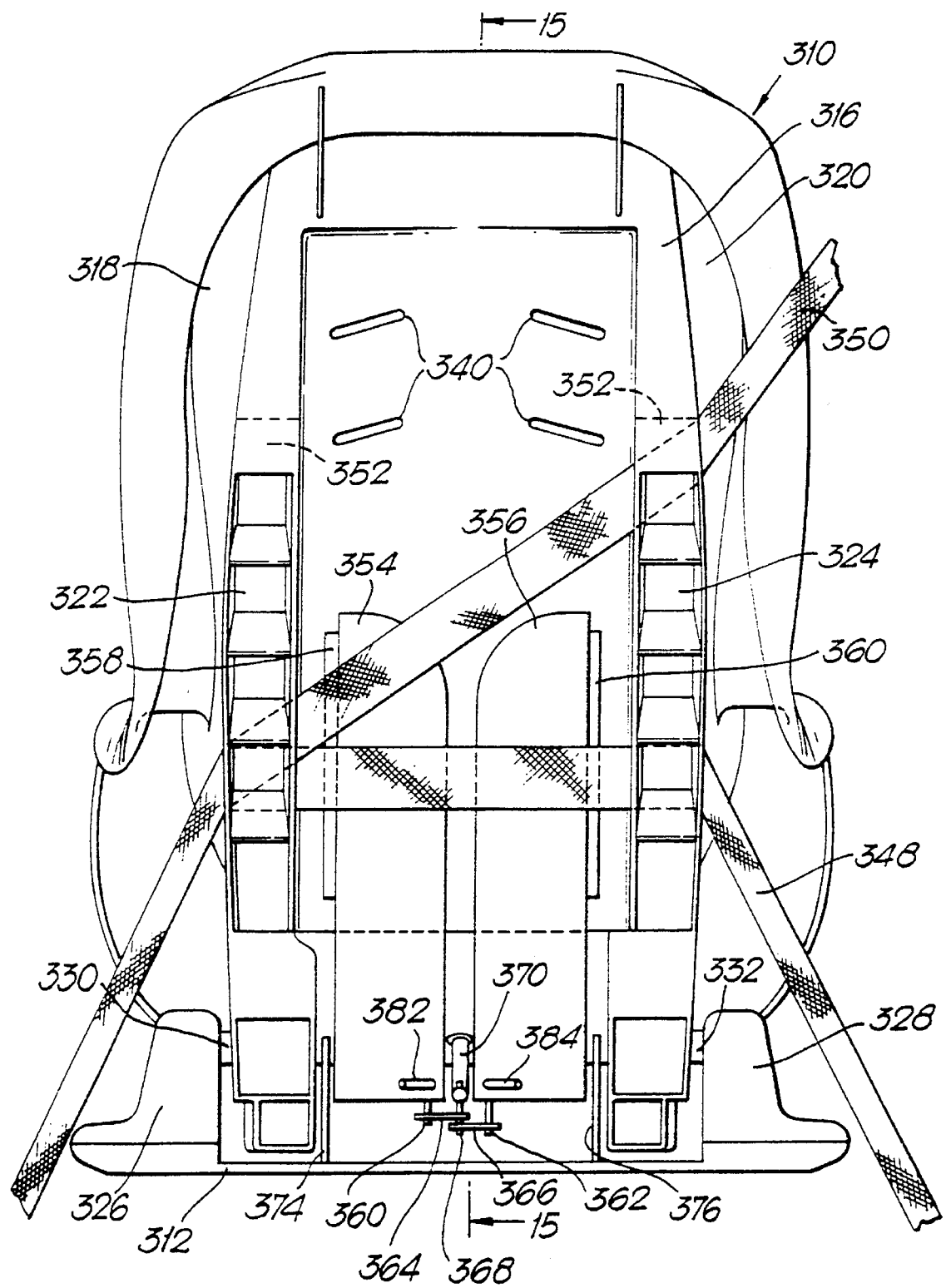
FIG. 13 is a rear elevation of a child safety seat in accordance with a fifth embodiment of the invention, with the strap deflecting means in the first position.
Figure 14:
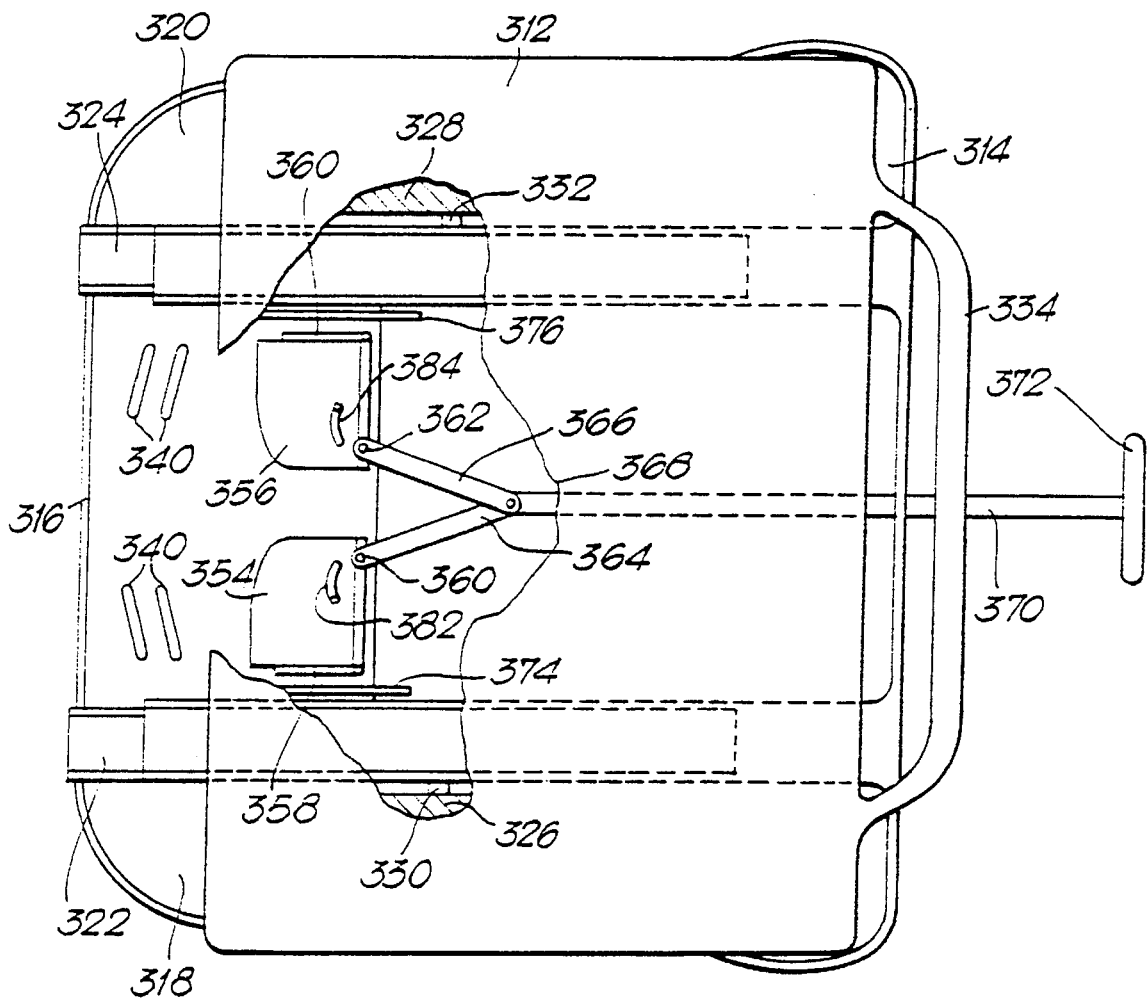
FIG. 14 is a partially broken away plan view from below of the seat shown in FIG. 13, with the strap deflecting means in the first position.
Figure 15:
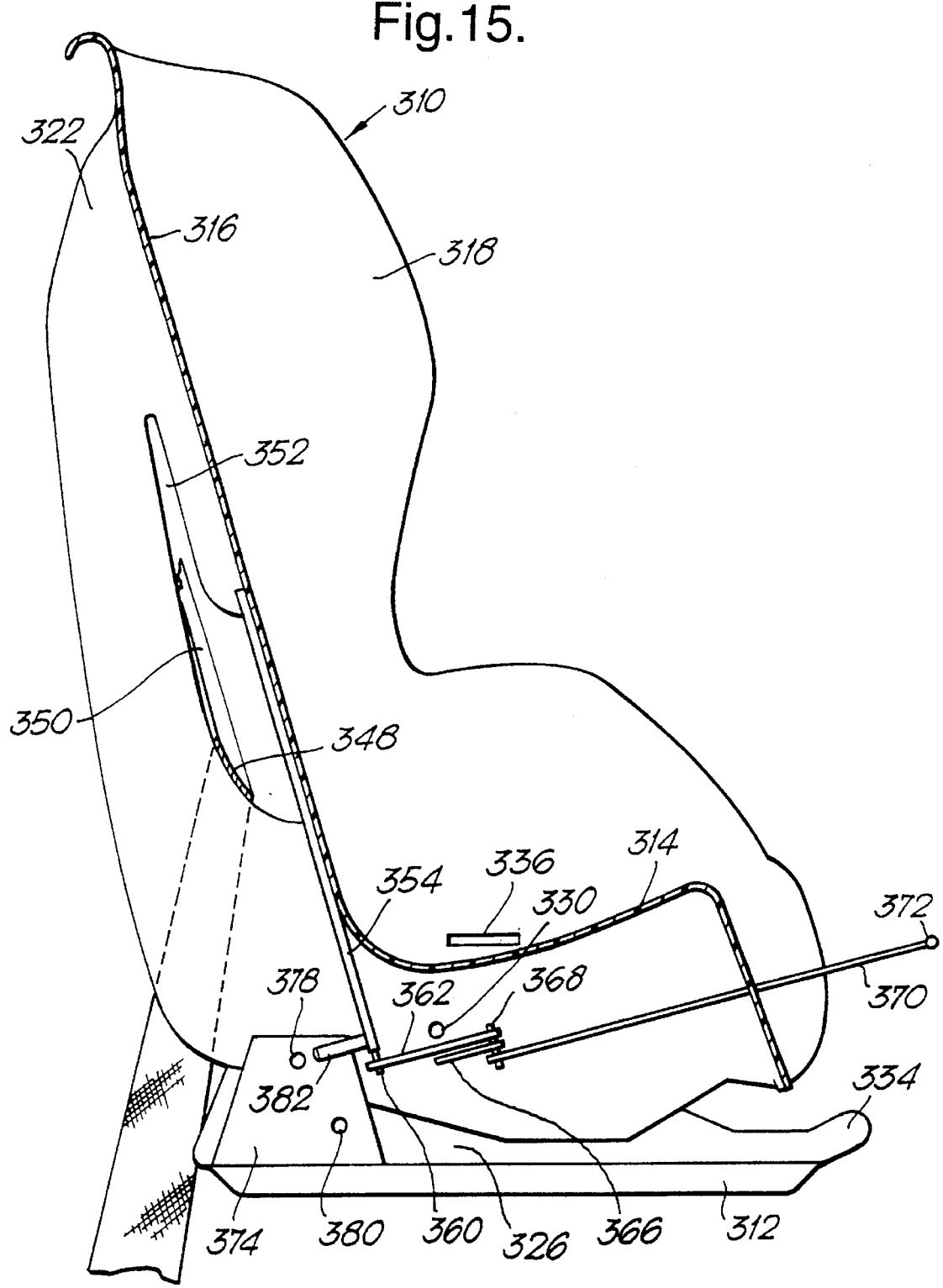
FIG. 15 is a sectional view taken on the line 15—15 in FIG. 13.
Figure 16:
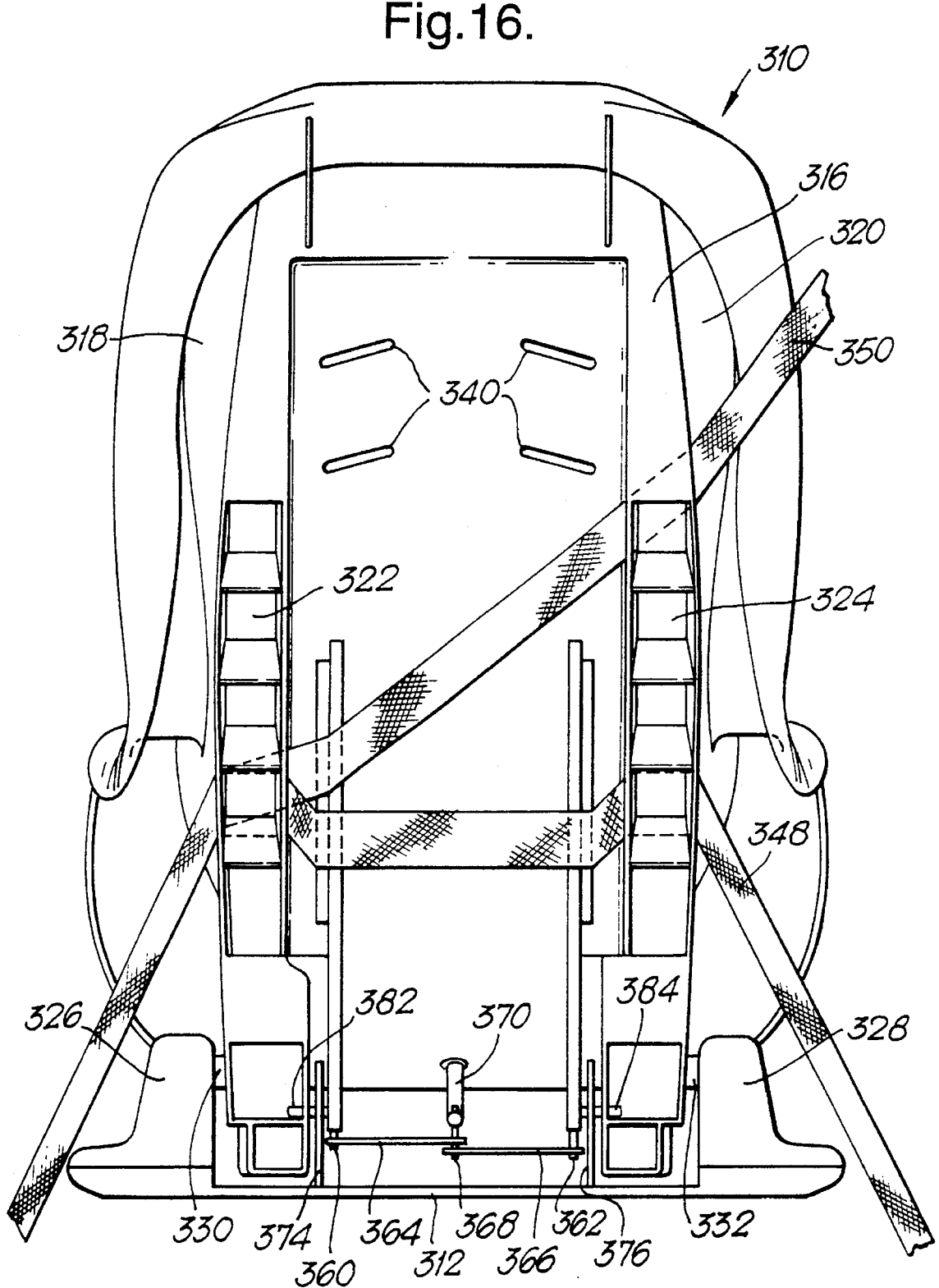
FIG. 16 is a rear elevation of the seat shown in FIG. 13, with the strap deflecting means in the second position.
Figure 17:
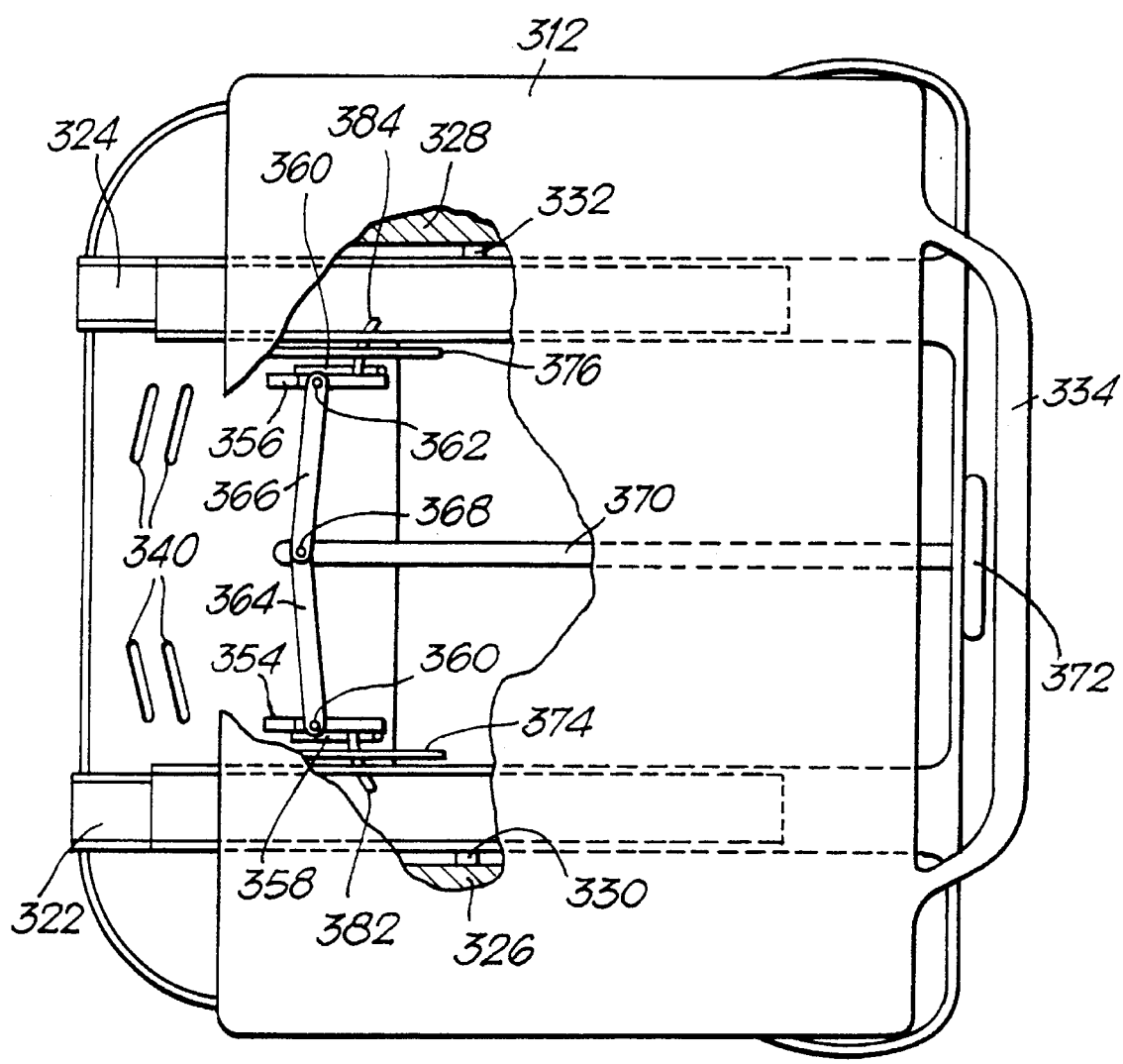
FIG. 17 is a partially broken away plan view from below, similar to FIG. 14 but with the strap deflecting means in the second position.

A pair of flaps 354 and 356 are mounted on the backrest 316 by respective hinges 358 and 360 which extend adjacent to the openings 352 in respective beams 322 and 324 so that each of the flaps 354 and 356 can pivot between a position in which it abuts against the back of the backrest 316, as shown in FIGS. 13, 14 and 15, and a position in which it extends across its respective opening 352 so as to deflect the lap strap 348 and shoulder strap 350 of the adult seat belt rearwardly from their direct path between the openings 352 in the two beams 322 and 324, as illustrated in FIGS. 16 and 17. In order to control this movement, each of the flaps 354 and 356 has a respective pivot pin 360, 362 projecting downwardly from its bottom edge near the corner further from the hinges 358 and 360. The pivot pins 360 and 362 are connected by respective links 364 and 366 to a pivot pin 368 on one end of an operating rod 370 which projects outwardly from the front edge of the seat shell 310 below the seat portion 314 and which has a handle 372 on its outer end.

The base 312 has a pair of plates 374 and 376 extending upwardly parallel to the walls 326, 328 and adjacent to the inner face of the rear part of each of the beams 322 and 324. Each of the plates 374 and 376 has a respective upper latch hole 378 and a respective lower latch hole 380 (FIG. 15). The flaps 354 and 356 have respective arcuate bolts 382, 384 projecting from what are their rear faces in FIGS. 13 to 15. When the flaps are pivoted to the positions illustrated in FIGS. 16 and 17, these bolts 382 and 384 engage in the upper holes 378 in the plates 374 and 376 to secure the seat shell 310 is in its upright position, as illustrated, and through the lower holes 380 to secure the seat shell 310 is in its reclined position. The bolts 382 and 384 also serve the purpose of preventing the handle 372 from being pushed in fully when the seat shell 310 is in an intermediate position. As can be seen from FIGS. 16 and 17, the bolts 382 and 384 extend into the respective beams 322 and 324 when fully engaged.

In use, the child seat is positioned in the vehicle and the handle 372 pulled out to the position illustrated in FIG. 15 in order to fold the flaps 354 and 356 flat against the back of the backrest 316, as illustrated in FIGS. 13 and 14. Next, the adult belt is threaded through the openings 352 in the beams 322 and 324, fastened and tightened manually. The handle 334 is used to pull the base 312 forwardly or rearwardly on the vehicle seat, so as to pivot the seat shell 310 about the stub axles 330 and 332, either to its upright position or to its reclined position, as desired. The handle 372 is then pushed in so as to cause the flaps 354 and 356 to further tighten the adult seat belt 348, 350. Since the pivot pin 368 on the rear end of the rod 370 is moved further towards the back of the seat that the pivot pins 360 and 362 on the flaps 354 and 356, the inward force exerted by the adult seat belt 348, 350 on the rear edges of the flaps 354 and 356 tends to displace the rod 370 further to the rear but any such movement is resisted by abutment of the handle 372 against the front edge of the seat portion 314 of the shell 310. The bolts 382 and 384 project through either the holes 378 or the holes 380 in the plates 374 and 376, to secure the seat shell 310 in the desired position.

If it is desired to move the seat from the upright position to the reclined position or vice versa, the handle 372 is first pulled out, thereby both disengaging the bolts 374 and 376 and slackening the adult seat belt somewhat so that it can slide freely in the openings 352 as the seat shell 310 is tilted. The seat shell 310 is then moved to its desired position using the handle 334 on the base 312. Finally, the handle 372 is pushed back to re-engage the bolts 382 and 384 and retighten the straps 348 and 350 of the adult seat belt. This operation can be performed without disturbing a sleeping child occupant of the seat since there is no need to disengage the child harness.

When the child seat is to be removed from the vehicle, the handle 372 is first pulled out. The adult seat belt can then be unfastened and pulled out of the openings 352.

We claim:

1. A child safety seat for use in a vehicle comprising:

a seat body having a seat portion and a backrest portion, a child restraint for an occupant of the seat secured to the seat, guide means on the seat having strap abutment surfaces defining a strap path for a strap of a vehicle seat belt to secure the seat to a vehicle seat, and strap deflecting means mounted on the seat for movement relative to said guide means between a first position clear of said strap path and a second position in which said strap deflecting means abuts against a strap following said strap path to deflect such strap from said strap path and thereby to tighten such strap.

2. A child safety seat according to claim 1, wherein the guide means comprises first and second strap guides spaced apart from one another along said strap path and the strap deflecting means is located between the first and second strap guides.

3. A child safety seat according to claim 2, further comprising blocking means arranged to obstruct passage along said strap path of objects of larger cross-section than said strap when the strap deflecting means is in its second position.

4. A child safety seat according to claim 3, wherein the strap deflecting means comprises a pivotally mounted lever and manually operable control means for causing angular movement of said lever between said first and second positions and the blocking means comprises a shutter coupled to the control means so as to be moved thereby into a position extending across part of the guide means when the pivotally mounted lever is in its second position.

5. A child safety seat according to claim 2, wherein the strap path between the first and second strap guides is straight.

6. A child safety seat according to claim 5, wherein the seat body comprises a moulded shell having a pair of reinforcing beams projecting rearwardly from the backrest portion and the strap guides comprises openings in each of the beams.

7. A child safety seat according to claim 2, wherein the strap deflecting means comprises a pivotally mounted lever and manually operable control means for causing angular movement of said lever between said first and second positions.

8. A child safety seat according to claim 7, wherein the control means comprises a shaft extending longitudinally under the seat portion and having a handle on its front end, and a coupling means coupling the shaft to the pivotally mounted lever.

9. A child safety seat according to claims 7, wherein the child restraint includes a buckle mounted on a stalk, and the control means comprises a pivotal mount for the stalk, and a coupling means connecting the pivotal mount to the pivotally mounted lever.

10. A child safety seat according to claim 7, wherein the control means comprises a flap which ms pivotally mounted in an opening in the seat portion, and coupling means connecting the flap to the pivotally mounted lever so that the flap is level with the seat portion when the pivotally mounted lever is in its second position.

11. A child safety seat according to claim 2, wherein the strap deflecting means comprises a reaction member having a recess adjacent to said strap path and a clamping member movable between said first position in which it is on an opposite side of said strap path to the reaction member and said second position in which it extends into the recess.

12. A child safety seat according to claim 11, wherein the clamping member comprises a clamping rod journaled in a pivot bearing mounted on the seat back, the recess is of frustoconical shape having its apex coincident with said pivot bearing, and link means couples the clamping rod to the seat body on an opposite side of the reaction member to the pivot bearing so as to constrain the clamping rod to move in a conical path.

13. A child safety seat according to claim 1, further comprising blocking means movable with the strap deflecting means and arranged to cooperate with the guide means to obstruct passage along said strap path of objects of larger cross-section than said strap when the strap deflecting means is in its second position.

14. A child safety seat according to claim 13, wherein the strap deflecting means comprises a pivotally mounted lever and manually operable control means for causing angular movement of said lever between said first and second positions and the blocking means comprises a shutter coupled to the control means so as to be moved thereby into a position extending across part of the guide means when the pivotally mounted lever is in its second position.

15. A child safety seat according to claim 1, wherein the strap deflecting means comprises a pivotally mounted lever and manually operable control means for causing angular movement of said lever between said first and second positions.

16. A child safety seat according to claim 15, wherein the control means comprises a shaft extending longitudinally under the seat portion and having a handle on its front end, and a coupling means coupling the shaft to the pivotally mounted lever.

17. A child safety seat according to claim 15, wherein the child restraint includes a buckle mounted on a stalk, and the control means comprises a pivotal mount for the stalk, and a coupling means connecting the pivotal mount to the pivotally mounted lever.

18. A child safety seat according to claim 15, wherein the control means comprises a flap which is pivotally mounted in an opening in the seat portion, and coupling means connecting the flap to the pivotally mounted lever so that the flap is level with the seat portion when the pivotally mounted lever is in its second position.

19. A child safety seat according to claim 1, wherein the strap deflecting means comprises a reaction member having a recess adjacent to said strap path and a clamping member movable between said first position in which it is on an opposite side of said strap path to the reaction member and said second position in which it extends into the recess.

20. A child safety seat according to claim 19, wherein the clamping member comprises a clamping rod journaled in a pivot bearing mounted on the seat back, the recess is of frustoconical shape having its apex coincident with said pivot bearing, and link means couples the clamping rod to the seat body on an opposite side of the reaction member to the pivot bearing so as to constrain the clamping rod to move in a conical path.

21. A child safety seat according to claim 20, wherein the link means comprises a lever which is rigidly attached to the clamping rod so as to project radially therefrom, and a link pivotally attached at one end to a radially outer end of the lever and pivotally attached at another end to the seat shell.

22. A child safety seat for use in a vehicle comprising:

a seat body having a seat portion and a backrest portion, a child restraint for an occupant of the seat secured to the seat, guide means on the seat having strap abutment surfaces defining a strap path for a strap of a vehicle seat belt to secure the seat to a vehicle seat, and strap deflecting means comprising a flap pivotally mounted on the backrest adjacent to the guide means so as to be pivotable between a first position in which it abuts against the backrest and a second position in which it extends across the guide means, and manually operable control means for causing angular movement of said flap from said first position to said second position, so as to tighten a strap following said strap path.

23. A child safety seat according to claim 22, wherein the flap, when in its second position, extends across the guide means sufficiently to obstruct passage along said strap path of objects of larger cross-section than said strap.

24. A child safety seat according to claim 22, wherein the control means comprises a slider extending longitudinally under the seat portion and having a handle on its front end, and pivot links coupling the slider to the flap.

25. A child safety seat according to claim 22, wherein the guide means comprises first and second strap guides spaced apart from one another along said strap path and the strap deflecting means is located between the first and second strap guides.

26. A child safety seat according to claim 25, wherein the flap, when in its second position, extends across the guide means sufficiently to obstruct passage along said strap path of objects of larger cross-section than said strap.

27. A child safety seat according to claim 25, wherein the control means comprises a slider extending longitudinally under the seat portion and having a handle on its front end, and pivot links coupling the slider to the flap.

28. A child safety seat for use in a vehicle comprising:

a seat body is pivotally mounted on a base for angular movement between an upright position and a reclined position and having a seat portion and a backrest portion, a child restraint for an occupant of the seat secured to the seat, guide means on the seat having strap abutment surfaces defining a strap path for a strap of a vehicle seat belt to secure the seat to a vehicle seat, strap deflecting means mounted on the seat for movement relative to said guide means between a first position clear of said strap path and a second position in which said strap deflecting means abuts against a strap following said strap path to deflect such strap from said strap path and thereby to tighten such strap, and a latch means linked to the strap deflecting means so as to block such angular movement when the strap deflecting means is in its second position.

29. A child safety seat according to claim 28, wherein the guide means comprises first and second strap guides spaced apart from one another along said strap path and the strap deflecting means is located between the first and second strap guides.

* * * * *